April 14, 1964 J. M. MORRIS ETAL 3,128,911
VIBRATORY FEEDER CONTROLS
Filed June 13, 1961
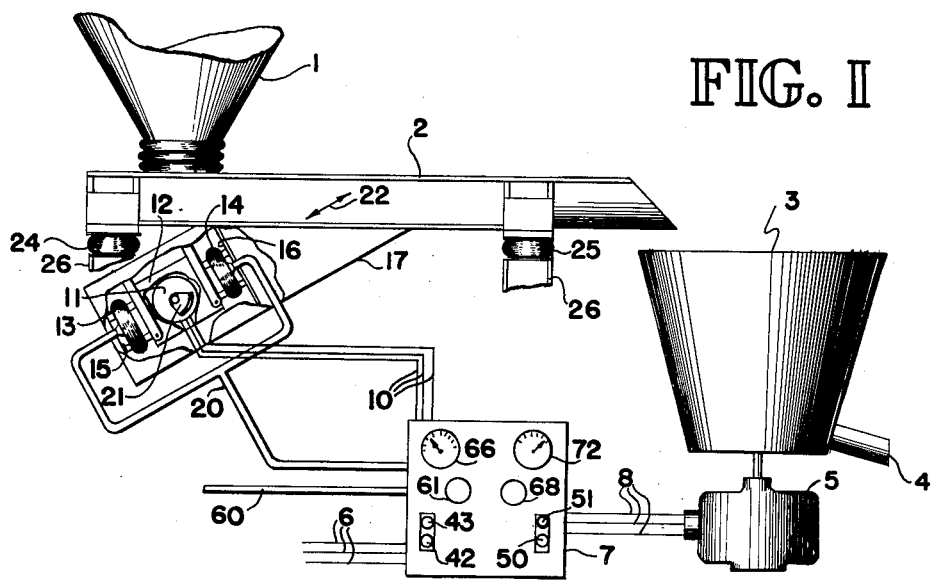
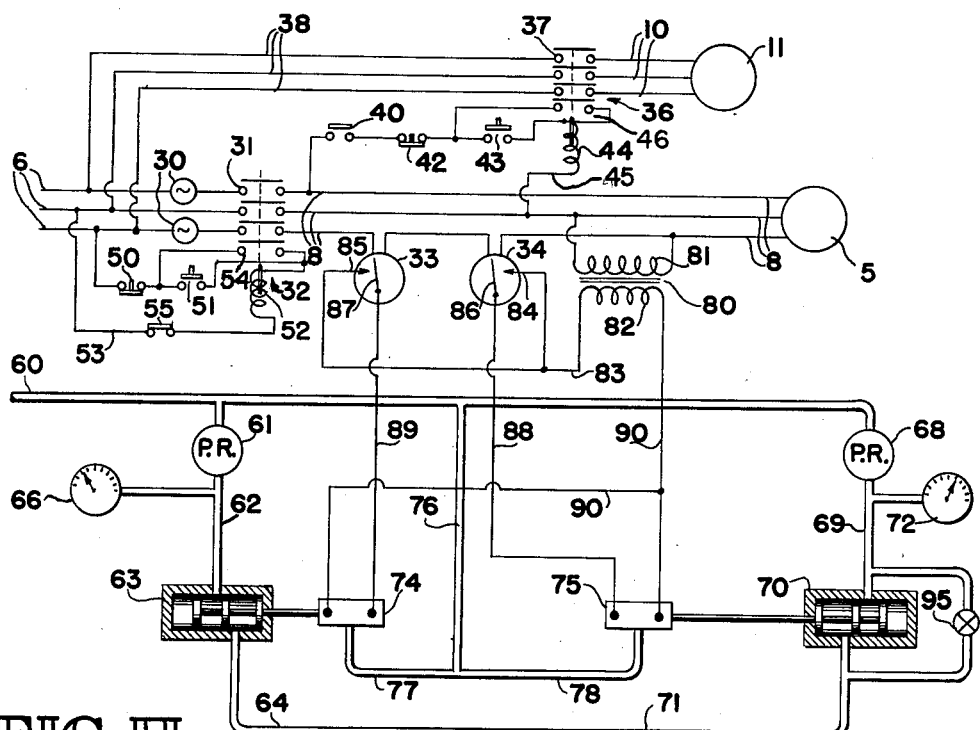
INVENTOR.
JOHN M. MORRIS
ROBLEY W. EVANS
BY Marshall & Wilson
ATTORNEYS

United States Patent Office 3,128,911
Patented Apr. 14, 1964

3,128,911
VIBRATORY FEEDER CONTROLS
John M. Morris, Louisville, Ky., and Robley W. Evans, New Albany, Ind., assignors to Chain Belt Company, Milwaukee, Wis., a corporation of Wisconsin
Filed June 13, 1961, Ser. No. 116,826
7 Claims. (Cl. 222—52)

This invention relates to vibratory feeders and in particular to means for controlling the rate of feed of a vibratory feeder in accordance with the demands for material from equipment downstream from the feeder.

Vibratory feeders are employed in many processing systems for transporting material from one processing station to another and for feeding material from a hopper or chute when it is desirable to feed the material at a relatively constant or controlled rate.

Known types of vibratory feeder controls do not permit easy adjustment of the rate of feed of the material but rather provide a more or less constant speed of delivery of material as long as the feeder is in operation.

The principal object of this invention is to provide a control for a vibratory feeder that varies the rate of feed according to the demands of the apparatus receiving the material from the feeder.

Another object of the invention is to provide a feeder control that is responsive to the load of material in a processing station receiving material from the feeder.

A still further object of the invention is to provide a vibratory feeder control that is responsive to the power demands of apparatus receiving material from the feeder and that varies the rate of feed in accordance with the load in such receiving apparatus.

These and more specific objects and advantages may be obtained from a feeder control constructed and operated according to the invention.

According to the invention the power or electrical current input into the drive motor of a conveying or processing apparatus is continually measured and the feed rate of a vibratory feeder feeding such apparatus is adjusted in accordance with such power or current in order to maintain the power or current substantially constant at a selected value representing a predetermined loading of the apparatus.

A preferred embodiment of the invention is illustrated in the accompanying drawings.

In the drawings:

FIG. I is a schematic side elevation of a vibratory feeder and processing station that operate according to the invention.

FIG. II is a schematic electrical and pneumatic diagram illustrating the electrical and pneumatic circuits and apparatus that cooperate to adjust the feed rate of material into a processing station according to the invention.

In an apparatus constructed and operated according to the invention, material in a hopper 1 is fed at a controlled rate by a vibratory conveyor or feeder 2 into a processing or transporting station represented generally by a crusher or mixer 3 that discharges the processed material through its outlet chute 4. The crusher or mixer 3 is shown by symbol because it is representative of a large class of processing equipment which in addition to crushers or mixers may also include bucket elevators, grinding mills or any generally similar apparatus having power demands that vary with the quantity of material in the apparatus. The crusher or mixer 3 is driven by an electric motor 5 which may include speed reducing gearing to adapt its output speed to the demands of the crusher or mixer. The motor 5 is energized from three-phase electrical power leads 6, by way of a control station 7 and leads 8 connected to the drive motor 5.

Preferably, the vibratory conveyor 2 is driven by a variably tuned eccentric weight vibration exciter although electromagnetically driven vibratory conveyors may also be used and the power into the electromagnetic drive controlled by the control mechanism of the invention. In the preferred system electrical power is supplied from the control station 7 through leads 10 to a motor 11 mounted in an exciter mass 12 that forms part of the vibratory system of the drive for the vibratory conveyor 2. The exciter mass 12 is resiliently held between a pair of air springs 13 and 14 which are mounted on plates 15 and 16 of a drive housing 17 rigidly attached to the conveyor 2. The air springs 13 and 14 are inflated to a controlled pressure through connecting hose and piping 20 connected to the control station 7. In operation the motor 11 generates vibratory force by rotating eccentric weights 21 mounted on its armature shaft. The unbalanced force of the weights 21 vibrates the exciter mass 12 on the air springs 13 and 14. When the system is tuned to resonance a large vibratory motion of the exciter mass 12 occurs and the corresponding vibration of the conveyor 2 occurs substantially along the direction indicated by the double-headed arrow 22. This vibration of the vibratory conveyor or feeder 2 causes material to flow from left to right as shown in the drawing. To prevent the transmission of objectionable vibrational forces to the building or framework on which the conveyor or feeder 2 is mounted, isolator air springs 24 and 25 are interposed between the conveyor or feeder and the supporting frame or building structural member 26.

The amplitudes of vibration of the exciter member 12 and conveyor 2 in response to the rotation of the eccentric weights 21 varies according to the tuning of the system which in turn varies according to the inflation pressure of the air springs 13 and 14. Preferably, the inflation pressure is adjusted, for maximum delivery, so that the operating speed of the system is slightly below the resonant or natural frequency of the vibratory system comprising the exciter mass 12, the springs 13 and 14, and the mass of the conveyor 2. When it is desired to reduce the rate of feed the inflation pressure of the air springs is increased thus raising the natural or resonant frequency of the system away from the operating speed. By operating at a speed remote from resonance, the amplitudes of vibration produced by the eccentric weights is reduced. The range of control available, by varying the inflation pressures of the air springs, is sufficient to provide rates of feed from no feed up to a maximum delivery rate.

The control equipment that is included in the control station 7 for controlling the air springs and the motors 5 and 11 is illustrated schematically in FIG. II. As shown in this diagram electrical power for the motors 5 and 11 is obtained from three-phase power leads 6 and is transmitted through fuses or overload relay coils 30 and thence through contacts 31 of a motor starter relay 32. From the motor starter relay contacts 31 power is transmitted through the leads 8 to the motor 5. Current to one of the leads 8 is taken through a pair of contact making ammeters 33 and 34 so that these ammeters are sensitive to the load on the driving motor 5. Contact making wattmeters may be used in place of the ammeters if desired.

Since it is undesirable to be able to feed material on the conveyor 2 into the processing station 3 unless the drive motor 5 is running the control power for operating a motor starter relay 36 for the motor 11 is taken from two of the leads 8 rather than from the input or power leads 6. In the circuit, as shown, the leads 10 to the motor 11 are connected through contacts 37 of the motor starter relay 36 and leads 38 to the power supply leads 6. The leads 38 could be connected to the leads 8 instead of the leads 6 if desired. The illustrated arrangement is preferred so that a service man, by manually operating the motor starter relay 36, may test the operation of the motor 11 without starting the motor 5.

The conrol circuit for the motor starting relay 36 includes contacts 40 of a pressure operated switch 41, contacts of a stop button 42, and contacts of a start button 43 that are connected in series between the upper one of the leads 8 and an operating coil 44 of the motor starter relay 36. A return lead 45 from the operating coil 44 is connected to another of the leads 8. Contacts 46 of the motor starter relay 36 are connected in parallel with the contacts of the stop button 43 to hold the motor starter relay 36 energized until the circuit is broken by opening contacts of the stop button 42 or of the pressure switch 41.

A generally similar circuit including contacts of a stop button 50 and start button 51 is provided for connecting one of the leads 6 to an operating coil 52 of the motor starter relay 32 for the motor 5. A return lead 53 from the coil is connected to another of the leads 6. The motor starting relay 32 has holding contacts 54, connected in parallel with the contacts of the start button 51, to hold the circuit closed once the relay is energized. Overload relay contacts 55, of the overload relay coils 30, connected in the lead 53 are arranged to deenergize the motor starter relay 32 whenever an overload occurs on the motor 5.

In the pneumatic circuit for controlling the inflation pressure of the air springs 13 and 14 air from a pressure source is supplied through a pipe 60 and thence through a low pressure regulator 61, pipe 62, valve 63 and pipe 64 leading to the pipe 20 that is connected to the air springs. The pressure switch 41, the contacts 40 of which are connected in series with the contacts of the stop button 42 for the motor starter relay 36 is connected through a pipe 65 to the pipe 20 leading to the air springs and is arranged to open its contacts 40 when the pressure drops below a predetermined minimum. A pressure gauge 66 connected to the pipe 62 indicates the pressure as controlled by the low pressure regulator 61. This low pressure regulator 61 is normally adjusted so that the controlled pressure in the line 62 corresponds to that inflation pressure for the air springs at which they are tuned approximately to resonance for maximum delivery of material.

Air pressure from the pipe 60 is also supplied through a high pressure regulator 68 that is connected through a pipe 69 and valve 70 to a pipe 71 which is also connected to the pipe 20 leading to the air springs. The pressure available from the high pressure regulator 68 when the valve 70 is opened supplies enough pressure to the air springs 13 and 14 to reduce the amplitude of vibration to a minimum. Ordinarily, the pressure regulator 68 may be adjusted in reference to the inflation pressures so that when the valve 70 is opened long enough for the pressure in the line 20 and in the air springs to correspond to the pressure in the pipe 69, as indicated by the pressure gauge 72, the feeder or conveyor will feed at a rate such that the processing apparatus or crusher 3 cannot be overloaded. Ordinarily, this is a relatively small fraction of the total capacity of the crusher or other processing equipment.

The valves 63 and 70 are positioned in either open or closed position by electrically controlled pneumatic actuators 74 and 75 which are arranged so that as long as their operating coils are electrically energized they admit air from the pressure pipe 60 through pipe 76 and branch pipes 77 or 78 to the cylinders of the actuators 74 or 75 to drive the corresponding valves 63 or 70 to their open positions. When the electrical power to the controls is shut off the valevs return automatically to their closed positions.

The coils of the electrically controlled operators 74 and 75 are supplied with power from a stepdown transformer 80 having its primary winding 81 connected to the power leads 8 feeding the motor 5. One terminal of a secondary winding 82 of the transformer 80 is connected through a lead 83 to contacts 84 and 85 of the contact making ammeters 33 and 34. The cooperating contacts 86 and 87 of the ammeters are connected through leads 88 and 89 respectively to feed the coils of the pneumatic operators 74 and 75. The return lead 90 of these coils is connected to the other terminal of the secondary 82 of the transformer 80.

In the operation of this device contacts 85, 87 of the ammeter 33 are arranged to close whenever the current to the motor 5 is below a certain value representing the minimum acceptable loading in the crusher, mixer or other device 3. Likewise the contacts 84, 86 of the ammeter 34 are arranged to close whenever the current drain of the motor 5 indicates that the motor is operating at or near the full or predetermined load condition of the mixer or crusher 3.

To start the apparatus the start push button 51 is pressed to energize the motor starter relay 32 which in turn starts the crusher or mixer drive motor 5. The crusher may be empty at this time so that the motor 5 then operates at little or no load. Assuming that there is no air pressure in the air springs, the pressure in the line 20 is low so that the pressure switch 41 opens its contacts 40 to prevent starting the feeder drive motor 11. However, the energization of the leads 8 by providing power through the control transformer 80 and the now closed ammeter contacts 85 and 87, which are closed since the motor is operating at no load, opens the valve 63 so that air from the supply pipe 60 can enter the air springs and inflate them to the minimum pressure for maximum feed rate. As soon as this pressure is reached the pressure switch 41 closes its contacts 40 and the start button 43 may then be operated to energize the starting relay 36 for the motor 11. This motor, upon reaching full speed, provides the vibratory force to the exciter member 12 which, because the inflation pressure is now adjusted for resonant operation, causes vigorous vibration of the vibratory system and feeding of the material at the maximum feed rate. As the material is fed into the crusher or mixer 3 the load on the motor 5 increases and when it approaches the normal operating condition the contacts 85 and 87 separate thus closing the valve 63. At this time the minimum pressure conditions exist in the air springs so that the conveyor or feeder continues to operate at its full feed rate.

The maximum feed rate of the feeder with the minimum pressure applied to the air springs preferably slightly exceeds the capacity of the mixer or crusher 3 so that the load on the motor 5 continues to increase and reaches a point at which contacts 84 and 86 of the overload or high load ammeter 34 close as the motor reaches its full load operating condition. Closure of these contacts completes a circuit through the leads 88 and 90 and operates the valve control 75 to open the valve 70 and thus add air from the high pressure regulator 68 into the air springs by way of the pipe 20. This increase in pressure detunes the vibratory system and reduces the amplitude of vibration and therefore the rate of feed of the feeder 2. This continues until the load on the motor 5 decreases to the point where the ammeter 34 opens its contacts 84, 86. As these contacts open the valve 70 recloses thus trapping air in the air springs and pipe 20 at whatever pressure then exists. The system then operates at that particular feed rate which may correspond to the normal feed rate through the crusher 3 or may exceed or be less than such feed rate. In the event the feed rate is less so that the crusher becomes partially loaded the ammeter 33 again closes its contacts which by opning the valve 63 allows the higher pressure in the pipe 20 and air springs to bleed back through the pressure regulator 61 to the atmosphere. This bleed back, by reducing the pressure in the air springs, increases the amplitude of vibration and thus the rate of feed. By restricting the rate of this flow back through the valve 63 the amplitude of vibration may be made to increase slowly and thus minimize any tendency for the system to surge or hunt.

If the feed rate is slightly too high so that the crusher motor becomes loaded to capacity the high current ammeter 34 again closes its contacts to bleed more high pressure air into the air springs thus reducing the rate of feed.

In some cases the tendency to hunt may also be reduced by providing a throttling valve 95 in parallel with the valve 70 to continually but slowly admit high pressure air from the high pressure regulator 68 into the pipe 20 thus slowly reducing the amplitude of vibration and rate of feed. This continues until the ammeter 33 closes its contacts whereupon valve 63 bleeds air from the system to increase the rate of feed over that determined by the ammeter 33 and the then loading on the motor 5 and the cycle repeats. Similarly a throttled bypass valve around the valve 63 can be used. In this case the amplitude slowly builds up until the load ammeter 34 operates to quickly raise the pressure and decrease the rate of feed.

This control of a vibratory feeder for regulating the feed to a processing station such as a crusher or mixer in accordance with the load in the crusher or mixer provides means for automatically maintaining the mixer at its full load condition, for maximum efficiency, while still protecting the system from overloads or from periods of relatively light load because of variations in the material being processed.

Various modifications in the specific structure and circuit arrangements may be made without departing from the spirit and scope of the invention.

Having described the invention, we claim:

1. In a processing assemblage control, in combination, an electrically driven processing apparatus in which the power varies with the rate of flow of material through the apparatus, electrical means for signaling variations in power input from a prescribed power input, a vibratory conveyor including pneumatic springs serving as resilient elements of the conveyor, said conveyor having a feed rate that varies with the pressure in the pneumatic springs, and control means connected to and responsive to said electrical signaling means for varying the pressure in said pneumatic springs in response to changes in power demand of said apparatus.

2. In a processing apparatus control, in combination, a crushing apparatus, electrical means for driving the apparatus, current measuring means responsive to the power flow to the electrical driving means for signaling the load in the apparatus, a vibratory conveyor for feeding raw material into the crushing apparatus, adjustable pneumatic springs adapted to tune the conveyor for regulating the feeding rate of the conveyor, and control means connected to the current measuring means for regulating the adjustable pneumatic springs adapted to maintain a substantially constant load on the crushing apparatus.

3. In a processing assemblage control, in combination, a crushing apparatus, electric motor means for driving the apparatus, current operated means for signaling the magnitude of the load on the motor means, a vibratory conveyor for feeding material into the apparatus, a plurality of pneumatic springs serving as resilient elements in the conveyor, said springs and the conveyor forming a resonant system the natural frequency of which varies with the inflation pressure of the springs, means applying vibratory force to the conveyor at a substantially constant frequency, and means controlled by said current operated means for controlling the inflation pressure in said springs for varying the feed rate of the conveyor.

4. In a processing assemblage control, in combination, a crushing apparatus, an electrical motor for driving the apparatus, a current operated relay connected in the power supply to said motor, said relay being responsive to the current flow representative of a predetermnied load in the crushing apparatus, a vibratory conveyor for feeding material into said apparatus, a plurality of air springs serving as tunable resilient members for the conveyor for varying the feed rate thereof, means for applying vibratory force to the conveyor and means controlled by said relay for tuning said air springs to maintain a predetermined work load in said crushing apparatus.

5. In a processing assemblage, in combination, a crushing apparatus, an electrical motor for driving the apparatus, relay means connected in the supply leads to the motor for signaling the magnitude of the load in the crushing apparatus, a vibratory conveyor for feeding material into said apparatus, means for supplying vibratory force at a substantially constant speed to said conveyor, a plurality of air springs serving as the resilient elements of said vibratory conveyor, and means controlled by said relay means for varying the air pressure in said air springs to vary the feed rate of the conveyor to maintain a predetermined load in said apparatus.

6. In a processing assemblage control, in combination, a processing apparatus having a power demand that varies with load, an electric motor for driving the apparatus, said motor drawing a load current that varies with the load in the apparatus, relay means responsive to the load current of the motor, a vibratory conveyor for feeding material into said apparatus, means for applying vibratory force to said conveyor, at least one air spring connected to the conveyor and adapted by change in air pressure to vary the feed rate of the conveyor, and means controlled by said relay means for varying the air pressure according to the measured load current to maintain a predetermined load in the processing apparatus.

7. In a processing assemblage control, in combination, a processing apparatus having a power demand that varies with load, an electric motor for driving the apparatus, said motor drawing a load current that varies with the load in the apparatus, relay means responsive to a first and a second value of the load current of the motor, a vibratory conveyor for feeding material into said apparatus, means including at least one pneumatic spring for applying vibratory force to the conveyor at a constant frequency, first supply means including a first pressure regulator and a first valve for inflating the pneumatic spring to a first pressure, a second supply means including a second pressure regulator and second valve for inflating the pneumatic spring to a second pressure, and means controlled by said relay means adapted to selectively operate said valves for varying the inflation pressure of the pneumatic spring and thus the amplitude of vibration of the conveyor to vary its feed rate according to the power demand of the processing apparatus.

References Cited in the file of this patent

UNITED STATES PATENTS

| | | |
|---|---|---|
| 1,549,970 | Hall | Aug. 18, 1925 |
| 2,766,939 | Weston | Oct. 16, 1956 |
| 2,984,339 | Musschoot | May 16, 1961 |